United States Patent [19]

Morris

[11] 3,790,846

[45] Feb. 5, 1974

[54] AUTOMATIC LOAD MONITORING AND TRANSFER CIRCUIT

[76] Inventor: Marion H. Morris, 1810 Austin Ave., Los Altos, Calif. 94022

[22] Filed: Dec. 18, 1972

[21] Appl. No.: 316,263

[52] U.S. Cl. .................................... 315/91, 315/88

[51] Int. Cl. .......................................... H05b 39/10

[58] Field of Search ................ 315/136, 132, 88, 91

[56] References Cited

UNITED STATES PATENTS

| | | | |
|---|---|---|---|
| 3,562,580 | 2/1971 | Blomgren et al. .................... | 315/88 |
| 3,577,173 | 5/1971 | Blomgren.............................. | 315/88 |
| 3,590,281 | 6/1971 | Russell........................... | 315/131 X |

*Primary Examiner*—Nathan Kaufman
*Attorney, Agent, or Firm*—Harry E. Aine

[57] ABSTRACT

Primary and standby loads are connected in parallel with a source of AC power. Primary and standby bidirectional thyristors are connected in series with the primary and standby loads respectively. Gate control circuits for the bidirectional thyristors are coupled together in such a manner that as one of the gate control circuits is energized it shunts current from the other to provide a bistable mode of operation. A phase shifter is provided for advancing the phase of the gate current to the primary thyristor relative to the phase of the gate current to the standby thyristor to initiate operation of the primary load. Upon an open circuit failure of the primary load, operation automatically switches to the standby load. The entire load monitoring and transfer circuit is conveniently housed in a twin lamp light socket. An indicator light is provided for indicating that the standby load is in operation or that the standby load is good as held in reserve.

10 Claims, 2 Drawing Figures

AUTOMATIC LOAD MONITORING AND TRANSFER CIRCUIT

BACKGROUND OF THE INVENTION

The present invention relates in general to automatic load monitoring and transfer circuits particularly useful for monitoring a load such as a lamp, detecting failure of the load or lamp, and automatically transferring operation of the circuit to a standby load or lamp.

Heretofore, automatic load monitoring and transfer circuits have been proposed for monitoring proper operation of a gaseous discharge lamp, detecting failure of the gaseous discharge lamp, and automatically transferring operation to a standby incandescent lamp. Such a prior art circuit is disclosed in U.S. Pat. No. 3,611,432 issued Oct. 5, 1971.

One of the problems with the prior art load monitoring and transfer circuit is that the circuit is relatively complicated. In most instances, it utilizes a relay and in one instance it utilizes a pair of bidirectional thyristors, back-to-back zener diodes and a transformer for coupling signals from the primary load circuit to the secondary load circuit. While such circuits may be useful for monitoring gaseous discharge lamps it is desired to provide a simplified circuit which is less costly and more easily packaged.

SUMMARY OF THE PRESENT INVENTION

The principal object of the present invention is the provision of an improved automatic load monitoring and transfer circuit.

In one feature of the present invention, primary and standby bidirectional thyristors are series connected in parallel branches containing primary and standby loads respectively, with the gate control circuits for each of the thyristors being coupled together in such a manner that conduction of load current through the primary load shunts current from the gate drive circuit of the standby load to maintain operation on the primary load so long as the primary load remains conductive.

In another feature of the present invention, a phase shifter is provided for shifting the relative phase of the gate drive current applied to the primary and standby bidirectional thyristors in such a manner to advance the phase of the gate drive current to the primary thyristor relative to that of the standby thyristor to assure initiation of operation on the primary load.

In another feature of the present invention, an indicator means, such as a lamp, is connected across the standby load for indicating that the standby load is in operation, thereby indicating that the primary load has failed and should be replaced.

In another feature of the present invention, an indicator means, such as an indicator lamp, is connected in series with the primary bidirectional thyristor and the standby load for indicating that the standby load is in operating condition and is being held in reserve.

In another feature of the present invention, the automatic load monitoring and transfer circuit is incorporated in the housing of a twin light socket, with one of the lamps serving as the primary load and the second lamp serving as the standby load to provide automatic switching from the first lamp to the second upon failure of the primary lamp.

Other features and advantages of the present invention will become apparent upon a perusal of the following specification taken in connection with the accompanying drawings wherein:

DESCRIPTION OF THE PREFERRED EMBODIMENTS

Figure 1:
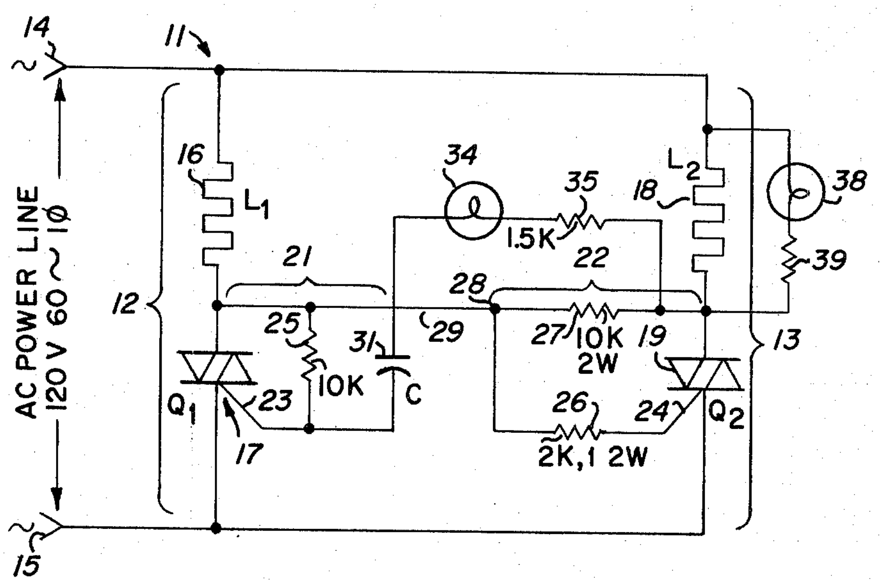
FIG. 1 is a schematic circuit diagram of an automatic load monitoring and transfer circuit incorporating features of the present invention.

Referring now to FIG. 1, there is shown an automatic load monitoring and transfer circuit 11 incorporating features of the present invention. The circuit 11 includes a primary circuit branch 12 parallel connected with a standby circuit branch 13, both branches 12 and 13 being connected across a source of AC power, such as a 120 volt, 60 cycle, single phase line connected at terminals 14 and 15. The primary circuit branch 12 includes a series connection of a primary load 16, such as an incandescent lamp having a rated power output of between 25 and 600 watts, series connected with a primary bidirectional thyristor 17, such as a triac. Similarly, the standby circuit branch 13 includes a series connection of a standby load 18 and a standby bidirectional thyristor 19. As in the primary circuit branch 12, the standby load 18 may comprise the same type of load as the primary load 16.

Each of the bidirectional thyristors 17 and 19 includes its respective gate control circuit 21 and 22 connected between terminal number one of the respective thyristor and its gate control electrode for supplying gate drive current to the respective gate electrodes. In each of the gate drive control circuits 21 and 22 resistance is connected between terminal number one and the gate for limiting the turn-on current to the gate control electrodes 23 and 24, respectively, to between 1 and 10 milliamps. The bidirectional thyristors 17 and 19 are preferably of the type to tolerate a surge load current of up to at least 30 amps.

In the primary gate control circuit 21 a current limiting resistor 25 is connected between terminal number one and the gate terminal. Resistor 25 has a resistance, as of 10 kΩ for limiting the turn-on gate drive current to the range of between 1 and 10 milliamps. Likewise, in the standby gate control circuit 22, a series connection of resistors 26 and 27 is provided between terminal number one and the gate terminal for limiting the turn-on gate drive current to the range of 1 to 10 milliamps. Resistors 26 and 27 form a voltage divider network having a node terminal 28 connected intermediate resistors 26 and 27. Resistor 26 has a value as of 2 kΩ and resistor 27 has a value as of 10 kΩ. The two gate control circuits 21 and 22 are interconnected via lead 29 which connects node 28 of the standby gate control circuit 22 to terminal number one of the primary thyristor 17.

A capacitor 31, such as a 1.0 microfarad, 400 volt capacitor, is connected in parallel with the current limiting resistor 25 in the primary gate drive circuit 21 for causing the phase of the gate drive current to the primary thyristor 17 to lead the phase of the gate drive current to the standby thyristor 19. In this manner the primary thyristor 17 is caused to fire before the standby thyristor 19 can fire. Due to the connection 29 between node 28 of the standby control circuit 22 and terminal number one of the primary thyristor 17, an advanced firing of the primary thyristor 17 causes the voltage which appears across the primary thyristor 17 to drop to a very low voltage as of 1 to 1.5 volts thus shunting the gate drive current from the standby gate drive control circuit 22 to assure that only the primary thyristor 17 fires.

In operation, application of AC power to terminals 14 and 15, as above described, causes the primary thyristor 17 to fire ahead of any possible firing of the standby thyristor 19 such that the primary parallel circuit branch 12 is rendered conductive for energizing the primary load 16 and at the same time disabling or rendering substantially not conductive the standby parallel branch 13. A small leakage current flows through the standby load 18 and resistor 27 and thence via lead 29 through the primary thyristor 17. The cold resistance of the standby load 18 is very small compared to the resistance of resistor 27 such that essentially the entire applied AC voltage is dropped across resistor 27.

In a preferred embodiment, an indicator lamp 34 such as a green 6 watt 120 volt lamp is connected across resistor 27 via a 1 watt 1.5 kΩ current limiting resistor 35 for indicating, when the primary load is energized, that the standby load 18 is good and is held in reserve.

Upon failure of the primary load 16, as by an open circuit, gate drive current for the primary thyristor 17 is no longer drawn through the primary load 16 but must be drawn through the standby load 18, current limiting resistor 27, and the current limiting resistor 25 of the primary gate drive circuit 21. Thus, in this case, since the gate drive current available at node 28 has a lower impedance path through resistor 26 to the gate electrode of the standby thyristor 19 than through the current limiting resistor 25 to the primary gate control electrode 23, the standby thyristor 19 is fired in preference to firing of the primary thyristor 17. This is accomplished in spite of the phase lead capacitor 31. Upon firing of the standby thyristor 19 the gate drive current to the primary thyristor 17 is insufficient to fire the primary thyristor such that the standby parallel branch 13 is rendered conductive in preference to conduction through the primary thyristor 17. Firing of the standby thyristor 17 causes the supply line voltage to be dropped across the standby load 18, thereby automatically energizing the standby load 18 and automatically transferring operation from the primary load 16 to the standby load 18.

In a preferred embodiment, a red indicator lamp 38, as of 6 watts and 120 volt rating, is connected across the standby load 18 via a current limiting resistor 39, as of 1.5 kΩ. Indicator lamp 38 will be lit when the load voltage is dropped across the standby load 18. Thus, in a situation where it is not obvious to the operator by observation of the separate loads 16 and 18, an observation of the indicator lamp 38 advises the operator that the primary load 16 has failed and needs replacement. This can be particularly advantageous in a situation where loads 16 and 18 are concealed from view within a frosted translucent globe assembly such that the red light will be observable through the translucent globe.

Although, as thus far described in the present disclosure, the phase shift capacitor 31 has been provided for leading the phase of the gate drive current to the primary thyristor 17, the phase shifting means may just as well lag the phase of the gate drive current to the standby thyristor 19. Such a delay could be obtained by the provision of a relatively large capacitor connected between node 28 and terminal 15.

Figure 2:
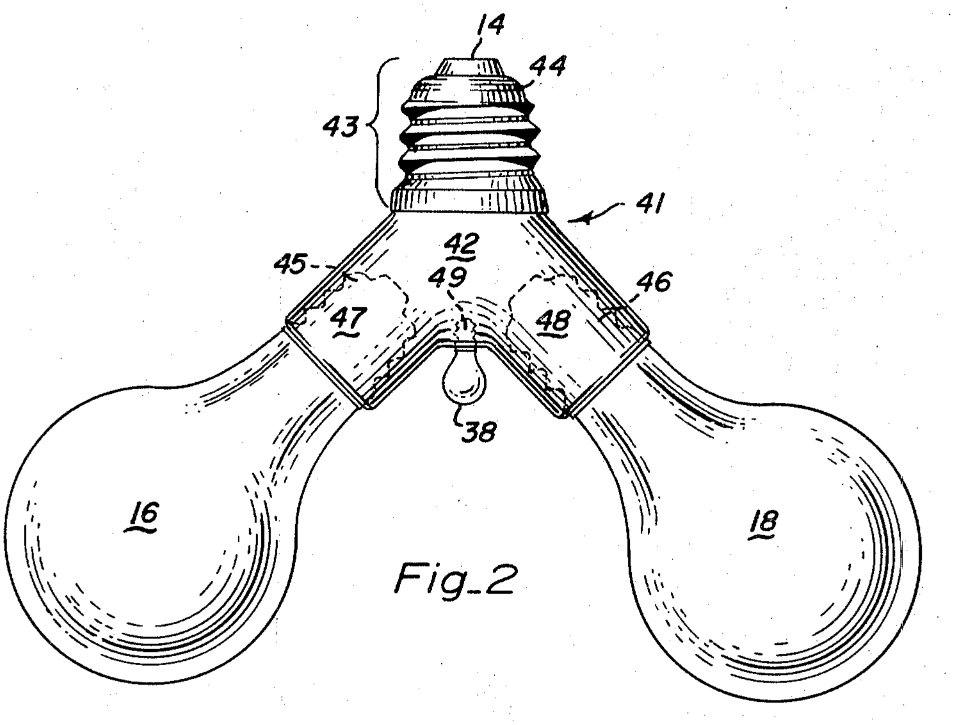
FIG. 2 is a side elevational view of a twin bulb light socket incorporating features of the present invention.

Referring now to FIG. 2, there is shown a preferred embodiment of a physical realization of the circuit of FIG. 1. More particularly, a conventional twin lamp screw-in fixture 41 has been modified to incorporate the automatic load monitoring and transfer circuit 11 of FIG. 1. The twin lamp fixture 41 includes a hollow insulative housing 42 having a threaded two-terminal male connector 43 including an outer threaded conductive terminal 15 for mating with a similarly threaded bore in a conventional light socket. The second terminal 14 is carried in the center at the end of the connector 43 in coaxial alignment with the threaded terminal 15 and held in insulative relation therefrom via an annular insulator 44. Center conductive terminal 14 makes contact with the center terminal of the socket, not shown.

Conventional lamp sockets 45 and 46 are contained in opposite leg portions 47 and 48 of the housing 42 to receive the threaded terminals of primary lamp 16 and standby lamp 18, respectively. Indicator lamp 38 is threaded into a third socket 49 provided in the housing 42. The remaining portion of the circuit of FIG. 1 is contained within the housing 42 to provide a self-contained twin lamp automatic load monitoring and transfer device.

What is claimed is:

1. In an automatic load monitoring and transfer circuit:

means for connecting primary and standby loads in parallel with each other and for connecting said primary and standby loads across a source of AC power;

primary and standby bidirectional thyristors connected in series with said primary and standby load connecting means respectively to define with said load connecting means primary and standby parallel circuit branches;

primary and standby gate control circuits for controlling electrical conduction through said respective primary and standby bidirectional thyristors;

means interconnecting said primary and standby gate control circuits for shunting gate drive current from said standby gate control circuit upon firing of said primary bidirectional thyristor and for preferentially firing said standby bidirectional thyristor upon open circuit failure of said primary load; and phase shifting means connected for advancing the phase of the gate drive current to said primary bidirectional thyristor relative to the phase of the gate drive current to said standby bidirectional thyristor, whereby advanced firing of said primary bidirectional thyristor serves to gate load current through said primary load connecting means and serves to shunt gate drive current from said standby thyristor to hold said standby thyristor in the nonconductive state so long as said primary load remains conductive.

2. The apparatus of claim 1 wherein said primary and standby bidirectional thyristors each comprise triacs, and wherein said primary and standby gate control circuits include primary and gate resistor means interconnecting respective gate and terminal number ones of said respective primary and standby thyristors.

3. The apparatus of claim 2 wherein said standby resistor means of said standby gate control circuit includes a series connection of first and second resistors to define a node therebetween, and wherein said terminal number one of said primary thyristor is connected to said node of said standby gate control circuit.

4. The apparatus of claim 3 wherein the resistance of said primary gate control resistor means is approximately equal to the resistance of said first resistor means of said standby gate control resistor means, and wherein the resistance of said second resistor of said standby gate control circuit is substantially less than the resistance of said first resistor of said gate control circuit.

5. The apparatus of claim 1 wherein said phase shifting means includes, a capacitor connected between terminal number one and the gate control terminal of said primary bidirectional thyristor.

6. The apparatus of claim 1 wherein said means for connecting said primary and standby loads in parallel includes, a housing having a pair of lamp sockets formed therein to receive primary and standby incandescent lamps forming said primary and standby loads.

7. The apparatus of claim 1 including, primary and standby loads connected in parallel via said primary and standby load connecting means, and wherein said primary and standby loads comprise primary and standby incandescent lamps, respectively.

8. The apparatus of claim 1 including, an indicating means connected in series with said standby load and said primary bidirectional thyristor for sensing and indicating a conductive path through said standby load.

9. The apparatus of claim 1 including, an indicating means connected in parallel with said standby load for indicating conduction of load current through said standby parallel circuit branch.

10. The apparatus of claim 6 wherein said housing includes, a third lamp socket to receive an indicating lamp for indicating flow of load current through said standby lamp.

* * * * *